Sept. 27, 1938.    H. A. HOWELL    2,131,436
DYNAMO-ELECTRIC MACHINE
Filed July 7, 1937
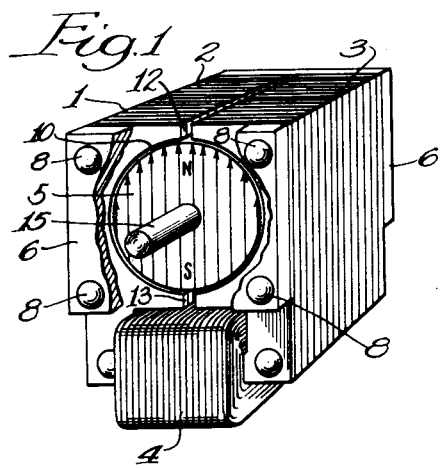
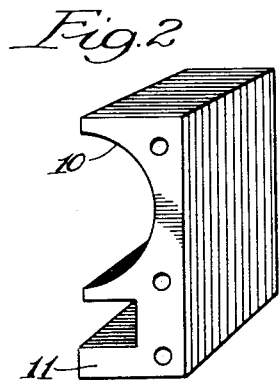
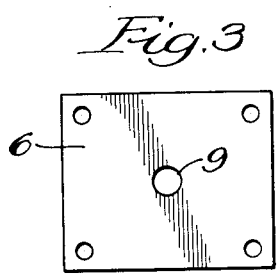
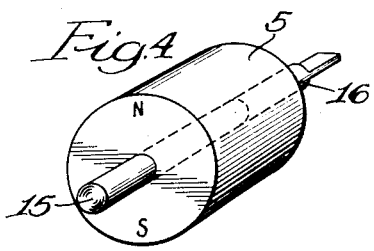
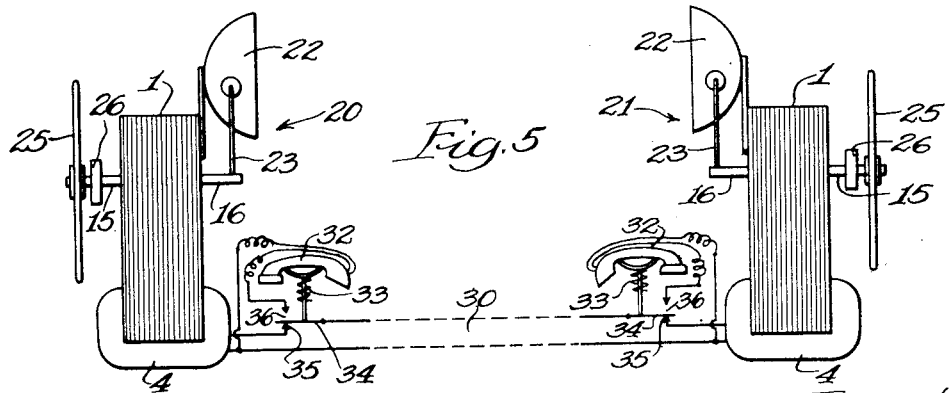
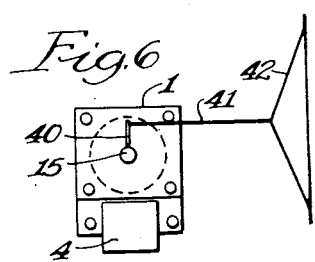
Inventor:
Hugh A. Howell,
By Morris Spector
Attorney.

Patented Sept. 27, 1938

2,131,436

UNITED STATES PATENT OFFICE 2,131,436

DYNAMO-ELECTRIC MACHINE

Hugh A. Howell, Berwyn, Ill., assignor to Frank Raffles, Chicago, Ill.

Application July 7, 1937, Serial No. 152,385

3 Claims. (Cl. 171—209)

This invention relates to dynamo electric machines, and more particularly to such machines as are adapted for the generation or utilization of small amounts of electric power, that is, from a fraction of a watt to say less than ten or fifteen watts.

It is one of the objects of the present invention to provide a dynamo electric machine which may be used as a generator or a motor, and which will require no winding whatsoever for the rotor thereof, thereby greatly reducing the cost of the machine. The rotor of the machine of the present invention is devoid of all windings as well as all current carrying bars or the like which are provided on certain types of standard alternating current machines.

The machine of the present invention includes a stator which is provided with a winding, and a windingless rotor comprising a solid cylindrical mass of alloy material that is magnetized to constitute a permanent magnet, and has a very high coercive force and an exceedingly high energy product.

The material of which the rotor is made comprises an alloy of iron, aluminum and nickel, with other metals optionally added. One method of making the alloy, and the composition thereof, is fully described in my pending application, Serial No. 151,029, filed June 29, 1937, entitled "Process for making cast permanent magnets", to which application reference is here made as though the same were incorporated herein. Iron is a major element of the alloy, but the alloy has a very high nickel content and a high aluminum content. An alloy made in accordance with the teachings of my above mentioned application can be magnetized to form an exceedingly powerful permanent magnet. The alloy is molded into a cylindrical form of proper dimensions to constitute the rotor of the dynamo electric machine, with aligned holes in each end or a continuous hole therethrough, for receiving a mounting shaft. The alloy of the present invention is exceedingly hard and is cast as accurately as possible in order to reduce or entirely eliminate machining thereof.

The dynamo electric machine of the present invention can be used as an electric generator wherever very small amounts of power are necessary. In the present application I have illustrated one use of the same, namely, to provide for bell ringing for a batteryless toy telephone set. This is merely illustrative since this type of apparatus may be used to generate electric power wherever small amounts of power are necessary, and may be put to uses other than generation of electric power. By way of example, a few instances are here given, namely, the generation of electricity for a toy wind operated power plant; a toy electric hand shocking machine or generator; a bicycle lighting generator; an automobile wind operated generator for illuminating a radiator ornament; a device operating as a sensitive polar relay; a sensitive current indicator such as a meter; a driver for the sound producer of a radio loud speaker or a sound transmitter; a synchronous clock motor; a generator for the ignition system for model or toy aeroplane or other gas engines; a generator for supplying current to a flash light; a generator for flashing signals for toy electric and mechanical trains. The above are but a few instances where electrical apparatus constructed in accordance with the teachings of the present invention may be useful.

The attainment of the above and further objects of the present invention will be apparent from the following specification taken in conjunction with the accompanying drawing forming a part thereof.

In the drawing:

Figure 1 is a perspective view of a dynamo electric machine embodying the present invention, a part of the machine being broken away for illustrative purposes;

Figure 2 is a perspective view of a part of the stator structure of the machine of Figure 1;

Figure 3 is a front view of an end plate of the machine of Figure 1;

Figure 4 is a perspective view of the rotor of the machine of Figure 1;

Figure 5 is a diagrammatic view illustrating a telephone system utilizing two dynamo electric machines such as are shown in Figure 1, for bell ringing purposes; and Figure 6 shows another embodiment of this invention.

Reference may now be had to Figure 1. The machine is indicated in general by the reference numeral 1 and includes a stator comprising two sets of stacks 2 and 3 of exceedingly thin sheet iron laminations, each lamination being of a construction illustrated more fully in Figure 2, an electric winding 4, and a cast rotor 5 journaled in end plates 6—6 that are secured to the stack of laminations 2 and 3. For this purpose a number of brass rivets 8 pass through the end plates 6 and the stacks of laminations for firmly securing the assembly. The end plates are made of brass or other non-magnetic material and each end plate has a hole 9 formed therein which constitutes a bearing for the rotor 5.

Each of the laminations of the two stacks 2 and 3 has an arcuate cutaway portion 10 constituting a pole of the machine, and has a winding receiving portion 11. The winding receiving portions 11 of the two stacks of laminations are passed into a preformed wound coil 4 until the portions 11 of the two stacks abut against one another. The rotor 5 is then inserted between the pole surfaces 10, and the end plates 6 are then slipped over the rotor shafts 15 and 16 and riveted in place by the rivets 8. The stator stacks 2 and 3 provide two air gaps 12 and 13 in the path of the magnetic flux.

The rotor 5 consists of a solid cylindrical mass of metal devoid of any electric windings and devoid of the usual embedded or otherwise formed conducting bars, such as are provided in certain types of induction machines. The solid mass of material of the rotor consists of an alloy of iron, aluminum and nickel, with the iron constituting the major ingredient and the nickel and aluminum together being present in large amounts. One preferred alloy composition contains iron 60%, nickel 30% and aluminum 10%, although it is to be understood that this composition may be departed from without departing from the spirit of the invention. I have found that the alloy is suitable if it contains iron from approximately 50% or less, to 70%, nickel 20 to 40% and aluminum 8 to 15%. Other metals may also be present in the alloy, namely, copper or the like. Alloys suitable for this purpose are described in the United States patents to Tokushichi Mishima, numbered 2,027,994 to 2,028,000, to which reference is here made.

The mounting shaft 15—16 is inserted into the cylindrical mass, which shaft may comprise two separate stub shafts or one continuous shaft. The rotor is then magnetized so that the lines of flux extend in the manner illustrated by the arrow ended lines in Figure 1, with approximately half of the periphery of the cylinder constituting a north pole and the other half constituting a south pole. The lines of flux extend substantially parallel to one another, as is illustrated in Figure 1, the neutral points between the north and south poles being exceedingly narrow. Because of this the stator gaps may also be made quite narrow, giving a more nearly perfect sine wave form of E. M. P. when the rotor is rotated, and consequent higher power output.

From the above description it is apparent that when the rotor of the machine of Figure 1 is rotated, a flux change will be produced in the magnetic path extending through the winding 4 with the resulting generation of an alternating electromotive force therein that can be directed from the winding 4 to any apparatus capable of utilizing the same. Conversely, it is apparent that if an alternating or pulsating current is sent through the winding 4 it will produce alternation in the flux traveling from the pole surface 10 through the rotor cylinder and cause rotation or oscillation of the rotor. When the rotor is at an angle to the position illustrated in Fig. 1, as for instance, turned 90° from the position indicated in Fig. 1, the flux from the north pole of the rotor passes through the air gap between the rotor and the stator and then divides so that part of it passes through the air gap 12 to the opposite stator, part of it passes through the air gap 13 to the opposite stator, and part of it passes through the shunt 11 and the air gap between adjacent stacks of laminations to the opposite stator part. From the construction illustrated and described, it is apparent that the winding-receiving portions 11 of the two stacks of laminations constitute a shunt path paralleling the flux paths including the air gaps 12 and 13. This shunt path, it is to be noted, also contains an air gap or its equivalent, viz: at the place of abutment between the portions 11 of the two stacks. The reluctance of this last-mentioned gap or break in the continuity of the magnetic path through the coil 4 is sufficient to increase the magnetic reluctance of this path sufficiently to prevent substantially all of the flux of the stator from passing through this shunt path. This permits electrical starting of the rotor from any position thereof. As a result there is no dead center position from which no motion of the rotor could be produced.

Reference may now be had more particularly to Figure 5 wherein I have illustrated one application or use of the machine of Figure 1. In this figure I have shown at 20 and 21 two telephone stations of a toy telephone system. It is to be noted that the telephone system is entirely batteryless. At each station there is located a dynamo electric machine 1 of a construction such as is shown in Figure 1, which machine has a bell 22 secured thereto and adapted to be rung by a flexible clapper 23 carried by the shaft 16. The shaft 16 has a dial 25 or other means for rotating the same suitably coupled thereto, as by means of a coupling member 26 so that upon turning of the dial 25 the rotor is turned. In the usual construction the dial is arranged to be oscillated through an arc somewhat less than 360°, and spring means is provided for returning the dial to its initial position on release of the dial.

In the telephone system of Figure 5 if the dial at the station 20 is turned and then released, resulting in turning of the rotor shaft first in one direction and then in the other, a current will be generated in the winding 4 of the machine 1 at that station, which current passes through the line 30 to the winding 4 of the machine at station 21. That pulsating current produces corresponding changes in the flux through the stator and rotor of the dynamo electric machine 1 at station 21, which machine then acts as a motor and correspondingly turns or oscillates the rotor at that station, resulting in ringing of the bell at that station. Upon initiation of the turning of the dial at the station 20, it is to be noted that the dial at the station 21 is stationary. The rotor at station 21 would tend to operate as a synchronous motor, if it were in synchronism with the rotor at the station 1. Since it is not in synchronism, the first result is that the rotor at the station 21 commences to turn under the influence of the current through its coil produced by turning of the rotor at the station 20. A short time thereafter the rotor at the station 21 is 180° out of phase with the rotor at station 20 and immediately thereafter commences to rotate in the reverse direction. This continues for a short time until there has been a sufficient angular displacement between the two rotors to cause the rotor at the station 21 again to reverse its direction of turning. As a result, a continuous rotation of the dial at the station 20 will produce an oscillation of the rotor at the station 21, which oscillation is effective to ring the bell at station 21. When the telephone instrument 32 at the station 20 is removed from its hook or holder, a spring 33 raises a switch 34 to open the circuit at 35 and close the circuit at 36, thus disconnecting the dynamo electric machine 1 at said station from the line 30 and connecting the telephone receiver and transmitter thereto. A corresponding action takes place at the station 21 upon removal of the receiver from the hook at that station. The two receivers are preferably constructed in the manner illustrated in my application entitled "Telephone" which is filed of even date herewith, so that conversation may be carried on over the line 30 without the use of a battery.

While I have shown the machine of Figure 1 utilized in a toy telephone system, it is to be understood that the invention is not limited thereto, as this machine is of general application, as heretofore pointed out.

In Figure 6 I have shown the machine of Figure 1 applied to operate the cone of a cone type loud speaker. The shaft 15 of the machine 1 has a short extension 40 secured thereto which in turn is connected by a link 41 to the movable or cone element 42 of a loud speaker. Current, from the amplifier of a radio set or from any other type of voice current amplifier, flows through the coil 4 of the unit and produces oscillation of the rotor 5, which oscillation is transmitted through the link 41 to the cone 42 and produces the sound vibration thereof. This unit may be used as a sound transmitter since sound waves striking the cone 42 will cause vibration thereof, which vibration is transmitted from the cone to the shaft 15 to produce small oscillation of the rotor 5 and resulting generation of current in the coil 4, which current may be suitably amplified in any desired manner for transmission to the point of utilization. The cone 42 may thus at the same time constitute a transmitter and a receiver, as in the ordinary interoffice communication systems.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A dynamo electric machine comprising a stator including a winding and two magnetic structures shaped to form pole pieces and adapted to receive a rotor between them, each of the pole pieces extending through an arc of almost 180° so that two pole pieces substantially surround the hereinafter mentioned rotor with a small air gap between the pole pieces, at least one of the structures including a portion adapted to be inserted into a pre-formed winding towards the other structure to form a magnetic shunt around the pole pieces and through the winding, with the edge of the portion that extends into the winding constituting a break in the continuity of the magnetic shunt around the pole pieces, and a windingless permanent magnet rotor rotatable between the pole pieces.

2. A dynamo electric machine comprising a stator including a winding and two magnetic structures shaped to form pole pieces and adapted to receive a rotor between them, at least one of the structures including a portion adapted to be inserted into a pre-formed winding towards the other structure to form a magnetic shunt around the pole pieces and through the winding, with the edge of the portion that extends into the winding constituting a break in the continuity of the magnetic shunt around the pole pieces, and a windingless permanent magnet rotor rotatable between the pole pieces, the rotor comprising a solid cylinder magnetized so that the magnetic lines of force extend at right angles to the axis of the cylinder to form poles constituting a part of the continuous cylindrical surface, whereby the distance between the rotor and the pole pieces is constant for every angular position of the rotor, and the pole pieces extending around almost the entire periphery of the cylinder.

3. In combination a first dynamo electric machine comprising a stator including a winding and two magnetic structures shaped to form pole pieces and adapted to receive a rotor between them, at least one of the magnetic structures including a portion adapted to be inserted into a pre-formed winding towards the other structure to form a magnetic shunt around the pole pieces and through the winding, with the edge of the portion that extends into the winding constituting a break in the continuity of the magnetic shunt around the pole pieces, and a windingless permanent magnet rotor rotatable between the pole pieces, means for rotating the rotor, load means actuated by oscillation of the rotor; a second dynamo electric machine similar to the first machine and also including means for rotating its rotor and also including load means actuated by oscillation of its rotor, the windings of the two machines being electrically connected in a closed loop so that upon mechanical rotation of either rotor an alternating current is induced in the loop thereby causing the rotor of the other machine to actuate its load means.

HUGH A. HOWELL.